United States Patent Office 2,928,839
Patented Mar. 15, 1960

2,928,839

2 - METHYL - 6 - β - CYANOETHOXY - BENZOTHIAZOLES AS SENSITIZING DYE INTERMEDIATES

Curt B. Roth, Binghamton, Lester Horwitz, Bronx, and Harold Levine, Vestal, N.Y., assignors to General Aniline & Film Corporation, New York, N.Y., a corporation of Delaware No Drawing. Application March 27, 1958
Serial No. 724,274

5 Claims. (Cl. 260—304)

This invention relates to 2-methyl-6-β-cyanoethoxybenzothiazoles; the quaternary salts thereof, sentizing dyes derived therefrom and the silver halide emulsions sensitized with such dyes.

Benzothiazole radicals which are substituted in the 6-position by a hydroxy, acetoxy or carboxyethoxy group have already been recommended as intermediates in the preparation of certain cyanine dyes. However, the methods described so far do not provide benzothiazole nuclei in which a cyanoethyl group is attached to the 6-position of the benzothiazole by means of an ether linkage.

We have now found that extremely valuable sensitizing dyes can be prepared from benzothiazoles which contain a methyl group in the 2-position, a hydrogen atom or methyl group in the 5-position and a cyanoethoxy group in the 6-position. These bases which are readily quaternized by conventional methods can be reacted with cyclammonium quaternary salts containing a reactive group in the α-carbon to produce, inter alia, mono- and polymethine cyanine dyes which are valuable sensitizers for silver halide emulsions.

Among the objects of our invention are said bases, their preparation, quaternary salts derived therefrom, sensitizing dyes produced with said quaternary salts, and silver halide emulsions sensitized with said dyes.

The new bases, the preparation and use of which are contemplated herein, are 2-methyl-6-(β-cyanoethoxy)-benzothiazoles having the following general structure.

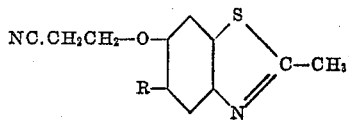

wherein R is a hydrogen atom or a methyl group.

These compounds are prepared by reacting 2-methyl-6-hydroxybenzothiazole or 2,5-dimethyl-6-hydroxybenzothiazole with a molar excess of acrylonitrile in the presence of a suitable basic catalyzing agent such as a tertiary amine, e.g., triethylamine, trimethylamine, tri-n-butylamine, tri-n-propylamine; a quaternary ammonium hydroxide, e.g., benzyltrimethylammonium hydroxide, cetylethyldimethylammonium hydroxide or cetyltrimethylammonium hydroxide. The desired dilution can be obtained by the use of an excess of acrylonitrile or by the selection of a suitable solvent such as benzene, toluene and the like.

The reaction which is carried out at elevated temperatures, preferably exceeding those of the boiling point of the solvent-diluent, or of the acrylonitrile when using an excess thereof in place of the solvent-diluent, is illustrated by the following formulae:

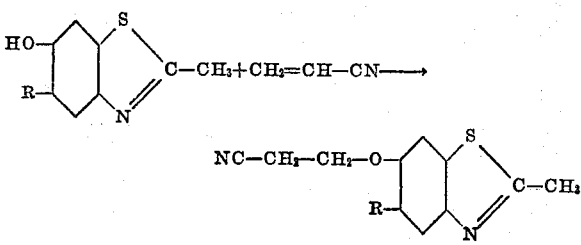

wherein R has the values given above.

The above obtained 6-(β-cyano)ethoxy-substituted benzothiazole base may be readily quaternized by conventional methods to produce the desired cyclammonium quaternary salts for the cyanine dye synthesis. For instance, the methiodide and the ethiodide are obtained by heating the base with methyl iodide or ethyl iodide, respectively, under pressure in a sealed container for several hours at 96–100° C. The quaternary salts obtained are characterized by the following general formula:

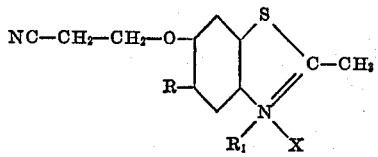

wherein R has the value given above; $R_1$ is alkyl such as methyl, ethyl, propyl, β-hydroxyethyl, γ-hydroxypropyl, allyl and the like; carboxyalkyl, such as carboxymethyl, carboxyethyl, and the like; aralkyl, e.g., benzyl, phenethyl and the like; and X is an anion such as chloride, bromide, iodide, ethylsulfate, perchlorate, p-toluenesulfonate, and the like.

The above quaternary ammonium salts may be converted into sensitizing dyes characterized by the following general formulae:

(A)
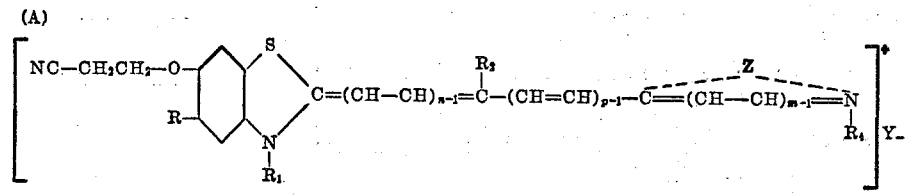

and (B)
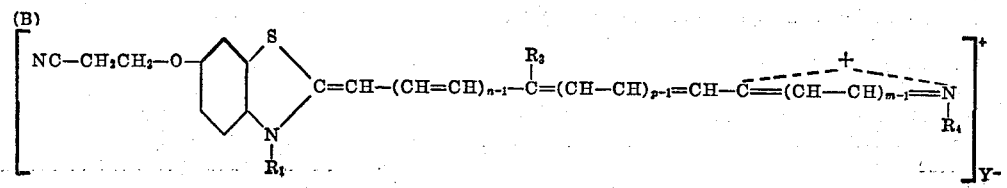

wherein R and $R_1$ have the values given above; $m$, $n$ and $p$ represent a positive integer of from 1 to 2; $R_2$ and $R_3$ are either hydrogen or a lower alkyl group, e.g., methyl, ethyl, propyl, and the like; $R_2$ being only hydrogen when $n$ and $p$ equal 1; $R_4$ represents an alkyl group such as methyl, ethyl, propyl, butyl, amyl; a hydroxyalkyl group such as hydroxymethyl, hydroxyethyl, hydroxypropyl and the like; carboxyalkyl such as carboxymethyl, carboxyethyl, carboxypropyl and the like; aralkyl, e.g., benzyl, phenethyl and the like; Y represents an anionic radical, e.g., Cl, Br, I, $ClO_4$, $SO_4CH_3$, $SO_4C_2H_5$, $SO_3C_6H_4OH_3$, and the like; and Z represents the hetero atoms necessary to complete a 5- or 6-membered nitrogenous heterocyclic system of the type used in cyanine dyes, such as pyridine, lepidine, quinoline, indoline, oxazole, thiazoline, thiazole, selenazole, selenazoline, oxazoline, benzothiazole, benzoselenazole, benzoxazole, naphthothiazole, and the like.

These sensitizing dyes are prepared by heating the above 6-(β-cyanoethoxy)-benzothiazolium salts in the presence of an acid binding agent such as pyridine, trimethylamine, triethylamine and the like with a cyclammonium quaternary salt having a reactive grouping on the carbon atom in the 2-position of the heterocyclic ring, for instance, a halogen atom, e.g., chlorine, bromine, or the like, an alkylmercapto group, e.g., methylmercapto, ethylmercapto, and the like; an alkylmercaptovinyl group, e.g., β-methylmercaptovinyl, β-ethylmercaptovinyl and the like; a β-alkylmercapto-β-alkylvinyl group, e.g., β-methylmercapto-β-methylvinyl, β-ethylmercapto-β-ethylvinyl and the like; β-acetanilidovinyl, 4-acetanilido-1,3-butadienyl, and 6-acetanilido - 1,3,5 - hexatrienyl.

As examples of suitable cyclammonium quaternary cyanine dye salt intermediates having a reactive group in the 2-position to the nitrogen atom thereof so as to form a monomethine dye, the following may be mentioned:

2-methylmercapto-6-methylquinoline ethiodide
2-methylmercapto-6-methoxyquinoline ethiodide
2-methylmercaptopyridine ethiodide
2-methylmercaptothiazoline ethiodide
2-phenylmercaptothiazoline ethiodide, and the like In preparing trimethine cyanine dye salts, the following cyclammonium quaternary dye salt intermediates having a reactive group in the β-position of the side chain in the 2-position of the nitrogen atom thereof may be employed:

2-(β-acetanilidovinyl)-thiazoline ethiodide
2-(β-acetanilidovinyl)-benzothiazole ethiodide
2-(β-acetanilidovinyl)-benzoxazole ethiodide
2 - (β-ethyl-β-ethylmercaptovinyl)-5-methoxybenzoselenazole ethiodide
2-(β-methylmercapto-β-methylvinyl)-benzothiazole ethiodide
2-(β-methylmercapto-β-propyvinyl)-benzothiazole ethiodide In preparing pentamethine and heptamethine cyanine dyes, the following cyclammonium quaternary salts having a reactive group in the delta- and omega-positions of the side chain in the 2-position of the nitrogen atom thereof may be employed:

2-(4-acetanilido-1,3-butadienyl)pyridine ethiodide
2-(4-acetanilido-1,3-butadienyl)benzoxazole ethiodide
2-4(-anilino-3-methyl-1,3-butadienyl)pyridine ethiodide
2 - (4 - anilino-3-methyl-1,3-butadienyl)-β-naphthoxazole ethiodide
2 - (4 - anilino-3-ethyl-1,3-butadienyl)-α-naphthothiazole ethiodide
2-(6-anilino-1,3,5-hexatrienyl)thiazoline ethiodide
2 - (6-anilino-1,3,5-hexatrienyl)-α-naphthothiazole ethiodide
2 - (6-anilino-1,3,5-hexatrienyl)-β-naphthothiazole ethiodide
2 - (6-anilino-1,3,5-hextrienyl)-α-naphthoselenazole ethiodide
2-(6-anilino-1,3,5-hexatrienyl)-β-naphthoselenazole ethiodide
2 - (6-anilino-4-methyl-1,3,5-hexatrienyl)thiazoline ethiodide
2 - (6 - anilino-4-methyl-1,3,5-hexatrienyl)benzothiazole ethiodide
2-(6-anilino-4-butyl-1,3,5-hexatrienyl)benzothiazole ethiodide We have found that our new dyes are especially useful for extending the spectral sensitivity of the customarily employed silver chloride, silver chlorobromide, silver bromide, silver bromoiodide and silver chlorobromoiodide developing out emulsions. The dyes are equally effective in gelatinous emulsions and in those emulsions in which a synthetic colloidal carrier such as modified polyvinyl alcohol is employed.

To prepare emulsions sensitized with one or more of our new dyes, it is only necessary to distribute homogeneously the dye or dyes in the photographic emulsions. The methods of incorporating dyes in emulsions are simple and are well known to those skilled in the art. In practice, it is convenient to add the dyes to the emulsions in the form of a solution in an appropriate solvent. Methanol has proved satisfactory for our new dyes; dimethylformamide or a mixture of acetone and freshly distilled pyridine may also be employed as a solvent. The dyes are advantageously incorporated in the finished, washed emulsions and should be uniformly distributed throughout the emulsions.

The concentrations of the dyes in the emulsions can vary widely, e.g., from 5–100 milligrams per liter of flowable emulsion. The concentration of the dyes will vary somewhat according to the type of emulsion and according to the effect desired.

With most of our dyes, from 15 to 30 milligrams of dye per liter of emulsion (containing about 40 grams of silver halide) suffice to produce the maximum sensitizing effect. With the fine grain emulsions, somewhat larger concentrations of dye may be needed to produce the maximum sensitizing effect.

The new dyes of our invention have been found to be particularly useful since they operate to increase the sensitivity of photographic emulsions containing color formers fast to diffusion to a higher extent than comparable sensitizing dyes without the 6-cyanoethoxy-substituted benzothiazole nucleus. The sensitizing bands of the new dyes of our invention are unusually sharp so that they render themselves advantageously for use in color emulsions.

The invention is further illustrated by the following examples although it is to be understood that the invention is not restricted thereto.

PREPARATION OF INTERMEDIATES

*Example I*

6-HYDROXY-2-METHYLBENZOTHIAZOLE

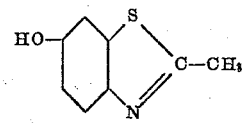

A mixture of 48 grams of sodium hydroxide, 48 grams of potassium hydroxide and 24 grams of sodium sulfide nonahydrate ($Na_2S.9H_2O$) was placed in a copper beaker and heated to a temperature of 250° C. To the fused alkali was added 40 grams of 2-amino-6-methoxybenzothiazole. The mixture was stirred and maintained at 250–260° C. for seven minutes. Eight hundred milliliters of water was added and the solution filtered.

To this alkaline solution of substantially pure 2-amino- 5-hydroxy-thiophenol was added 400 milliliters of acetic anhydride. After stirring for 30 minutes, the oil which had formed was separated and the solution extracted with five 400 milliliter portions of benzene. The oil and the extracts were combined and the benzene distilled off. The residue was refluxed with 400 milliliters of acetic anhydride for one hour and distilled. Twenty-four grams of solid was obtained which was substantially pure 2-methyl-6-acetoxybenzothiazole; M.P. 182° C.

The 24 grams of freshly vacuum distilled 6-acetoxy-2-methylbenzothiazole were dissolved in 23.5 milliliters of methanol and 100 milliliters of water. The solution was heated on a steam bath for a total of 7 hours with stirring. During this time, an aqueous sodium hydroxide solution (6 normal) was added slowly in such a manner that the solution was kept slightly alkaline to litmus paper at all times. The solution was filtered while hot and the filtrate acidified with glacial acetic acid. The solution was allowed to cool overnight. The product which had precipitated in quantitative yield was filtered off. For further purification, the compound was first recrystallized from methanol, then from ethanol, filtered off and washed with dry ether. The product was dried overnight at 50° C. The melting point of the analytically pure product was 163–164° C. sharp.

*Example II*

2,5-DIMETHYL-6-HYDROXYBENZOTHIAZOLE

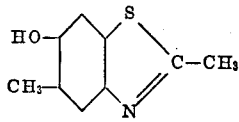

Into a 4-liter stainless steel beaker was charged 235 grams of sodium hydroxide pellets, 236 grams of potassium hydroxide pellets and 80 grams of sodium sulfide (Na$_2$S.9H$_2$O). The mixture was heated to 240–250° C. with vigorous mechanical stirring. Over a period of about 25 minutes was then added 200 grams of 2-amino-6-methoxy-5-methylbenzothiazole in small portions. Heating at 250° C. was continued for another 15 minutes. While stirring was continued, water was added to the black fusion mixture until the beaker was filled to within 5 cm. from the top. Stirring was continued for another 30 minutes. When the mixture had cooled down to about 55° C., it was filtered through a 21 cm. Büchner funnel, using about 100 milliliters of diatomaceous earth (Filter-cel®) as a filtering aid. The precipitate was washed once with hot water; the filtrate and the wash water were combined and allowed to cool. About 950 milliliters of acetic anhydride were added until the aqueous extract was slightly acidic. The mixture was stirred for one hour at 20° C. The precipitate which formed was filtered off, dried and then refluxed with 400 milliliters of acetic anhydride for one hour. The acetic anhydride was distilled off and the azole ring closure made by heating the diacetate for about 15 minutes. The resultant 2,5-dimethyl-6-acetoxybenzothiazole was then distilled under reduced pressure yielding about 80 grams of pure product.

The distillate was then dispersed in a solution consisting of 1 liter of water and 500 milliliters of methanol; aqueous sodium hydroxide (6 N) was added gradually, with continued stirring, to keep the stirred solution alkaline for six hours. During this time, the solution was kept at 75–80° C. and finally cooled to 5° C. The product was filtered and washed free of sodium hydroxide with water. The 44.7 grams of crude material was recrystallized from methanol; 37.5 grams of a pure product melting at 203–204° was obtained.

*Example III*

2-METHYL-6-β-CYANOETHOXYBENZOTHIAZOLE

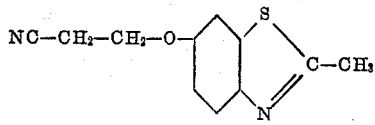

Eight grams (0.05 mole) of 2-methyl-6-hydroxybenzothiazole and 13.3 grams (0.25 mole) of freshly distilled acrylonitrile and 1 milliliter of benzyltrimethylammonium hydroxide (Triton B®) were heated to reflux on a steam bath for 20 hours. To the hot solution was then added 150 milliliters of benzene and 2 grams of (bone) charcoal. The black slurry was heated to reflux temperature for 10 minutes and then filtered through a Büchner funnel. The charcoal on the filter was extracted with hot benzene and the combined filtrates placed into a separatory funnel. The basic catalyst was removed by washing. The benzene solution was washed with distilled water until the wash water was neutral to alkacid paper. The benzene layer was then washed twice with 60 milliliters of a 2.5 percent aqueous sodium hydroxide solution in order to remove any unreacted 6-hydroxy-2-methylbenzothiazole. The benzene solution was subsequently washed with water until the wash water was neutral and then dried with anhydrous sodium sulfate overnight. Removal of the benzene and any acrylonitrile by distillation under aspirator vacuum yielded 7.60 grams of crude product. This material was crystallized from benzene. Yield: 6.6 grams; melting point 122–123°. A second recrystallization from benzene did not raise the melting point.

Analysis for C$_{11}$H$_{10}$ON$_2$S:

| | C | H |
|---|---|---|
| Calculated | 60.53 | 4.62 |
| Found | 60.59 | 4.62 |

*Example IV*

2,5-DIMETHYL-6-(β-CYANOETHOXY)BENZOTHIAZOLE

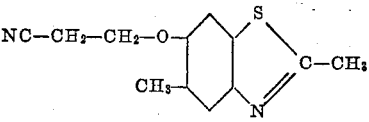

Example III is repeated except that the 8 grams of 6-hydroxy-2-methylbenzothiazole are replaced by 8.2 grams of 6-hydroxy-2,5-dimethylbenzothiazole.

*Example V*

6-(β-CYANOETHOXY)-2-METHYLBENZOTHIAZOLE ETHIODIDE

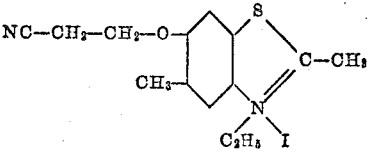

Six grams of 2-methyl-6-(β-cyanoethoxy)benzothiazole and 20 milliliters of ethyl iodide were heated in a sealed container on the steam bath for 6 hours. The quaternary salt obtained was purified by trituration with acetone, benzene and ether.

*Example VI*

3-(β-CARBOXYETHYL)-6-(β-CYANOETHOXY)2,5-DIMETHYLBENZOTHIAZOLIUM IODIDE

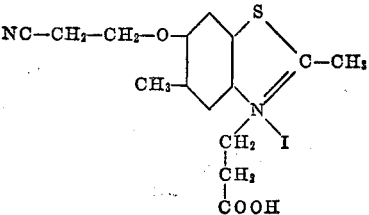

This product is obtained by heating 0.6 gram of 2,5-dimethyl-6-(β-cyanoethyl)benzothiazole and 5 grams of β-iodopropionic acid in a sealed bomb for 24 hours at 102° C. The resulant product is purified by trituration with ether, ethanol, acetone and again with ether.

*Example VII*

1',3-DIETHYL-6'-METHOXY-6-(β-CYANOETHOXY) THIAPSEUDOCYANINE IODIDE

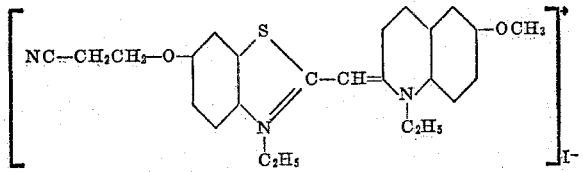

One hundred eighty seven milligrams (0.5 millimole) of 6-(β-cyanoethoxy)-2-methylbenzothiazole ethiodide and 190 milligrams (0.5 millimole) of 2-ethylmercapto-6-methoxyquinoline ethiodide were dispersed in 7 milliliters of methanol. Seven drops of triethylamine were added and the mixture heated to reflux for 5 minutes. The mixture was then cooled to room temperature and separated into 2 phases by centrifuging. The orange colored mother liquor was discarded and the dye purified by successive extraction with benzene, acetone and ether. After drying, 155 milligrams of dye was obtained exhibiting a melting point range of 303–305°. This compound sensitized a photographic gelatino silver bromoiodide emulsion to about 560–580 millimicrons with a maximum sensitivity at about 540–560 millimicrons.

*Example VIII*

4', 5'-BENZO-6-(β-CYANOETHOXY)-3,9-DIETHYL-3'-METHYLTHIACARBOCYANINE

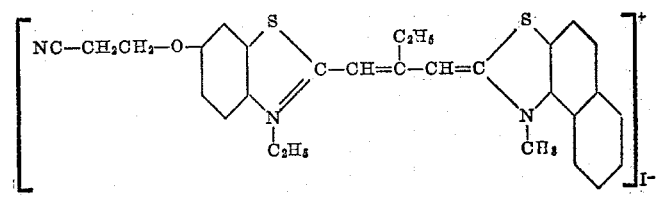

One hundred eight seven milligrams (0.5 millimole) of 6-(β-cyanoethoxy)-2-methylbenzothiazole and 278.5 milligrams (0.5 millimole) of 4,5-benzo-2-(β-ethyl-β-methylmercaptovinyl)-benzothiazole ethiodide were dispersed in 7 milliliters of methanol to which seven drops of triethylamine were then added. The mixture was heated to reflux for 5 minutes on a steam bath. The slurry was cooled to room temperature, and separated into two phases by centrifuging. The liquid portion was discarded while the solid was purified by successive trituration with isopropanol, acetone, methanol, benzene and ether. After drying, 315 mg. of dye was obtained which exhibited a melting point range of 238–240°. These compounds sensitized photographic gelatino silver bromoiodide emulsions to about 665 millimicrons with the maximum sensitivity at about 625 millimicrons.

*Example IX*

6'-(β-CYANOETHOXY)-3,3',9-TRIETHYL-5-METHOXY-SELENATHIACARBOCYANINE IODIDE

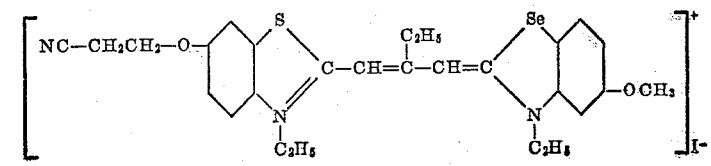

This dye is prepared by reacting 187 milligrams of 6-(β-cyanoethoxy)-2-methylbenzothiazole with 234 milligrams (0.5 millimole) of 2-)β-ethyl-β-methylmercaptovinyl)-5-methoxybenzoselenazole ethiodide under the conditions described in Example VIII. The dye was separated by centrifuging and the solvent decanted. The dye was then purified by successive trituration with acetone, methanol and ether. After drying, 250 mg. of dye was obtained exhibiting a melting point range of 277–279° This compound sensitized a photographic gelatino silver bromoiodide emulsion to about 660 millimicrons with a maximum sensitivity of about 625 millimicrons.

*Example X*

3-ETHYL-3'-(β-CARBOXYETHYL)-5'-METHYL-6'-(β-CYANOETHOXY)-THIACARBOCYANINE IODIDE

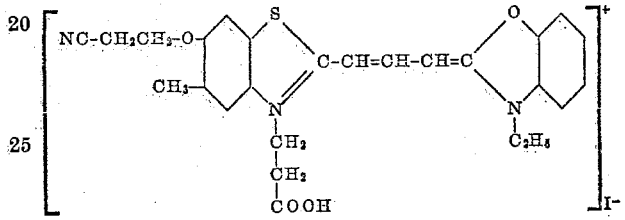

Twenty five drops of triethylamine were added to a solution of 187 milligrams of 3-(β-carboxyethyl)-6-(β-cyanoethoxy)-2,5-dimethylbenzothiazolium iodide and 216 milligrams of 2-(β-acetanilidovinyl)-3-ethylbenzothiazolium iodide in 20 milliliters of ethanol. The product which separated on cooling was washed with ethanol, acetone and ether.

Various modifications of this invention will occur to persons skilled in the art. Thus, our intermediates can be used not only for the preparation of mono- and polymethine dyes of the types illustrated by the examples, but lend themselves also to the preparation of merocyanine and styryl dyes. We, therefore, do not intend to be limited to the patent granted except as necessitated by the appended claims.

We claim:
1. A sensitizing dye intermediate having the following formula:

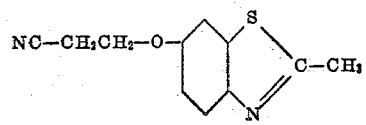

2. A sensitizing dye intermediate having the following formula:

NC—CH₂CH₂—O—[benzothiazole ring with CH₃ substituent]—C—CH₃

3. A sensitizing dye intermediate having the following formula:

NC—CH₂CH₂—O—[benzothiazole ring, N-C₂H₅, I⁻]—C—CH₃

4. A sensitizing dye intermediate having the following formula:

NC—CH₂CH₂—O—[benzothiazole ring with CH₃ substituent, N-CH₂CH₂COOH, I⁻]—C—CH₃

5. A sensitizing dye intermediate selected from the group consisting of the compounds having the following general formulae:

NC—CH₂CH₂—O—[benzothiazole ring with R substituent]—C—CH₃ and

NC—CH₂CH₂—O—[benzothiazole ring with R substituent, N-R₁, X⁻]—C—CH₃ wherein R is selected from the group consisting of hydrogen and methyl, R₁ is a member selected from the class consisting of methyl, ethyl, propyl-β-hydroxyethyl, α-hydroxypropyl, allyl, carboxymethyl, carboxyethyl, benzyl and phenethyl, and X is an anion.

No references cited.

UNITED STATES PATENT OFFICE
CERTIFICATE OF CORRECTION

Patent No. 2,928,839            March 15, 1960

Curt B. Roth et al.

It is hereby certified that error appears in the printed specification of the above numbered patent requiring correction and that the said Letters Patent should read as corrected below.

Columns 1 and 2, the right-hand portion of formula (B) should appear as shown below instead of as in the patent:

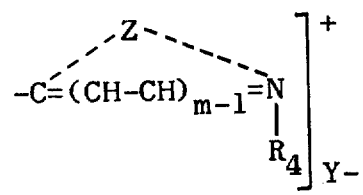

Signed and sealed this 30th day of August 1960.

(SEAL)
Attest:

ERNEST W. SWIDER  
Attesting Officer

ROBERT C. WATSON  
Commissioner of Patents